Patented Oct. 15, 1935

2,017,683

UNITED STATES PATENT OFFICE 2,017,683

CATALYST AND PROCESS FOR THE PRODUCTION AND REGENERATION THEREOF

Eugene Dwight Crittenden, Syracuse, N. Y., assignor to Atmospheric Nitrogen Corporation, New York, N. Y., a corporation of New York No Drawing. Application November 13, 1930, Serial No. 495,539

16 Claims. (Cl. 23—162)

This invention relates to a process for the production of catalysts. More particularly, this invention relates to a process for the production of a pure cobalt metal and to the production therefrom of a cobalt oxide contact material for catalyzing the oxidation of ammonia by means of oxygen.

It has heretofore been proposed to oxidize ammonia by passing it together with oxygen in contact with a heated catalyst consisting of cobalt oxide. Such a catalyst may be prepared by dissolving cobalt metal in nitric acid to form a solution of cobalt nitrate and preparing the catalyst from such a solution. It has, however, been heretofore considered that cobalt oxide alone is a relatively poor catalyst for the oxidation of ammonia, and in commercial practice resort has been had to catalysts comprising cobalt oxide together with a promoter. It has recently been discovered, however, that pure cobalt oxide without a promoter is a highly active and efficient catalyst for ammonia oxidation. I have found, however, that in preparing catalysts from commercial cobalt metal, it frequently happens that the catalyst has but a relatively low activity in catalyzing the oxidation of ammonia. Furthermore, it frequently happens that a cobalt oxide catalyst which has been used for a period of time for the oxidation of ammonia loses its activity due to the effect upon the catalyst of impurities in the gas, because of the catalyst being exposed to too high temperatures, or for other reasons.

I have discovered that by subjecting to a fusion purification, commercial cobalt metal or cobalt oxide which yields a relatively poor catalyst or spent cobalt oxide catalyst, e. g., catalyst which has deteriorated in use, the resulting cobalt metal may be used for the production of a highly active catalyst.

It is, accordingly, an object of this invention to provide a process for the purification of cobalt, starting either with the metal or with the oxide, whereby metallic cobalt is obtained which, upon treatment for the production of a contact material therefrom, yields an efficient highly active catalyst for the oxidation of ammonia.

The invention comprises treating fused cobalt metal at an elevated temperature with a flux, separating the fused metal from the slag which forms and converting the thus treated metal into a catalyst. When the cobalt is originally in the form of cobalt oxide, the invention further comprises reducing the cobalt oxide to cobalt metal which is then treated in the fused condition with a flux.

The invention accordingly comprises the several steps and the relation of one or more of such steps with respect to each of the others and the catalyst possessing the features and properties, which are exemplified in the following detailed disclosure and the scope of the invention will be indicated in the claims.

For a fuller understanding of the nature and objects of the invention, reference should be had to the following detailed description of a process for treating cobalt oxide material for the production of a catalyst therefrom. For purposes of illustration, the invention will be described as applied to the regeneration of a cobalt oxide which has been used for the oxidation of ammonia and has become relatively inactive by reason of its being poisoned by impurities in the gas or for some other cause. It is to be understood, however, that the invention is not limited in any way to the treatment of such a material, but is likewise applicable to cobalt oxide from other sources, or as will be particularly pointed out below to cobalt metal.

The cobalt oxide is first ground until the most of the material will pass through a 100 mesh screen. It is then mixed with about 17% to 19% of its weight of carbon, for example powdered coke or wood charcoal, and the mixture made into a heavy paste with a solution of sugar in water. A suitable solution is one containing about one part of sugar to every 5 parts of water by weight. This solution is added to the mixture in the proportions by weight of about 6 parts of the solution to about 15 parts of cobalt oxide in the mixture. The paste is granulated to form coarse granules and the granules dried by heating.

A portion of the granulated material is charged into an electric furnace arranged for heating by an electric arc and provided with carbon electrodes. An arc is established between the electrodes and positioned so as to heat the mixture. Under the influence of the high temperature, the cobalt oxide is reduced by the carbon and a pool of molten metallic cobalt forms.

After a quantity of molten cobalt metal is formed in the furnace, a flux consisting of a mixture of coarsely ground limestone (having a particle size of, for example 2 to 10 mesh) and powdered calcium fluoride are added in sufficient amount to cover the pool of molten metal. Suitable proportions of the flux materials are 3.5 to 5 parts of limestone to 1.7 to 3.5 parts of calcium fluoride for every 100 parts of cobalt oxide. Additional quantities of the granulated mixture of cobalt oxide, carbon and sugar are periodically fed to the pool of metal in the furnace, together with additional quantities of the flux, sufficient to keep a clean metal surface. The slag which forms on the surface of the pool of metal is removed from time to time.

When all of the oxide for a given run has been reduced and melted, a small quantity of powdered cobalt oxide containing substantially no carbon is added in amount sufficient to lower the carbon content of the fused metal to the desired percentage. It has been found desirable to maintain a carbon content of the cobalt of the order of 0.1% or less. After removing all of the slag which forms and adjusting the carbon content of the metal by addition of cobalt oxide, the heating is continued for a short time, 20 to 30 minutes for example, and the fused metal then dropped into water to form cobalt shot or solidified in divided form in any other desired manner.

When the material to be treated is in the form of metallic cobalt instead of cobalt oxide, the above described procedure is modified by omitting the admixing with carbon and sugar. The cobalt metal is charged into the electric furnace and heated to fuse a portion of it. After a small quantity of the metal has been melted, the flux is added in the proportions of about 3.5 to 5 parts of limestone and 1.7 to 3.5 parts of calcium fluoride for every 70 parts of metal. More metal may be added from time to time together with additional flux as required to maintain a clean metal surface of the fused pool. When the whole charge is molten, a small amount of cobalt oxide is added to remove carbon dissolved from the electrodes and the slag removed from the surface of the molten metal. The purified metal may then be converted into shot or otherwise cooled as described above. The metal is particularly free of phosphorus, calcium and arsenic and it is largely to the removal of these and similar impurities that I attribute the value of my process.

The purified cobalt metal may be converted into a cobalt oxide catalyst by any of the well known methods. In making a catalyst for the oxidation of ammonia, it is preferred to dissolve the cobalt metal in nitric acid to form a solution of cobalt nitrate. After filtering off any undissolved residue, the solution is evaporated and the cobalt nitrate heated at gradually increasing temperatures to decompose the nitrate and form cobalt oxide. A final temperature of heating of about 400° C. has been found satisfactory. The cake of cobalt oxide thus obtained is broken up into particles of a desired size which are placed in a suitable vessel. The catalyst is heated and a mixture of air and ammonia containing about 9% ammonia is passed in contact with the catalyst at a temperature of about 800° C. The ammonia is oxidized by the oxygen in the air to form oxides of nitrogen which may be recovered or may be converted into nitric acid as may be desired.

Since certain changes may be made in carrying out the above process without departing from the scope of the invention, it is intended that all matter contained in the above description shall be interpreted as illustrative and not in a limiting sense. Other fluxes than the above described mixtures of calcium carbonate and calcium fluoride may be used, for example, mixtures of calcium carbonate and silica, or a mixture of calcium carbonate, calcium fluoride and silica. The flux employed should have a proper melting point, i. e., it should be one which fuses in contact with the molten cobalt. Furthermore, it should be basic in character. In using fluxes containing an acidic constituent, therefore, the amount of this constituent should be so proportioned that the resulting slag is not acidic. It is, of course, apparent that the flux should not be one which will introduce deleterious substances into the cobalt treated therewith.

I claim:

1. The process of preparing a catalyst for the oxidation of ammonia which comprises treating cobalt metal containing impurities heated to fusion with calcium carbonate and calcium fluoride in proportions of about 3.5 to 5 parts of calcium carbonate and 1.7 to 3.5 parts of calcium fluoride for every 70 parts of cobalt, separating the thus treated metal from the slag and converting the separated metal into cobalt oxide.

2. The process of preparing a catalyst for the oxidation of ammonia which comprises treating cobalt metal containing impurities heated to fusion with calcium carbonate and calcium fluoride to form a slag, separating the thus treated metal from the slag, dissolving the separated metal in nitric acid to form a solution of cobalt nitrate, recovering cobalt nitrate from the solution, and heating said cobalt nitrate to decompose it and form cobalt oxide.

3. The process of preparing a catalyst for the oxidation of ammonia which comprises heating a mixture of cobalt oxide containing impurities and carbon to a temperature at which the oxide is reduced and fused metallic cobalt formed, treating the fused metal with a flux to form a slag, separating the thus treated metal from the slag, and converting the separated metal into cobalt oxide.

4. The process of preparing a catalyst for the oxidation of ammonia which comprises heating a mixture of cobalt oxide containing impurities and carbon to a temperature at which the oxide is reduced and fused metallic cobalt formed, treating the fused metal with a basic flux to form a slag, separating the thus treated metal from the slag, and converting the separated metal into cobalt oxide.

5. The process for preparing a cobalt catalyst, which comprises heating a mixture of cobalt oxide containing impurities and carbon to a temperature at which the oxide is reduced and fused metallic cobalt formed, treating the fused metal with calcium carbonate and calcium fluoride to form a slag, separating the thus treated metal from the slag and treating said metal to convert it into an active catalyst.

6. The process for preparing a cobalt catalyst, which comprises heating with carbon cobalt oxide containing impurities to reduce the oxide to cobalt metal, treating said metal heated to fusion with a flux to form a slag, adding cobalt oxide to the fused metal to regulate the carbon content thereof, separating the thus treated metal from the slag and treating said metal to convert it into an active catalyst.

7. In a process for preparing a cobalt catalyst, that improvement which comprises admixing cobalt oxide containing impurities with finely divided carbon, moistening the mixture with a solution of sugar, granulating the moistened mixture and drying the granular particles, heating the granulated mixture to a temperature at which the oxide is reduced and fused metallic cobalt formed, treating the fused metal with a basic flux to form a slag, and separating the thus treated metal from the slag.

8. In a process for preparing a cobalt oxide catalyst for the oxidation of ammonia, that improvement which comprises admixing finely divided cobalt oxide containing impurities with powdered coke in the proportions of about 17 to 19 parts of coke to every 100 parts of oxide, moistening the mixture with a solution of sugar, granulating the moistened mixture to form coarse granules, drying the granulated material, heating the dried material to a temperature at which the cobalt oxide is reduced and fused metallic cobalt is formed, treating the fused metal with calcium carbonate and calcium fluoride to form a slag in the proportions of about 3.5 to 5 parts of calcium carbonate and 1.7 to 3.5 parts of calcium fluoride for every 100 parts of cobalt oxide, adding to the fused metal cobalt oxide to regulate the carbon content thereof, and separating the thus treated metal from the slag.

9. The process of preparing a cobalt oxide catalyst for the oxidation of ammonia which comprises treating cobalt metal containing impurities heated to fusion with a basic flux in the proportions of about 5 to 8½ parts of the flux for every 70 parts of metal, separating the thus treated metal from the slag formed and treating the metal to convert it into cobalt oxide.

10. The process of regenerating spent cobalt oxide catalyst for the oxidation of ammonia which comprises reducing said catalyst to metallic cobalt, treating the metal heated to fusion with a flux, separating the thus treated metal from the slag, and converting the thus separated metal into cobalt oxide.

11. The process of regenerating spent cobalt oxide catalyst for the oxidation of ammonia which comprises mixing said spent catalyst with carbon, heating said mixture to a temperature at which the oxide is reduced and fused metallic cobalt formed, treating the fused metal with calcium carbonate and calcium fluoride to form a slag, separating the thus treated metal from the slag, and converting the separated metal into cobalt oxide.

12. The process of regenerating spent cobalt oxide catalyst for the oxidation of ammonia which comprises admixing said catalyst in finely divided form with powdered carbon in the proportions of about 17 to 19 parts of carbon to every 100 parts of cobalt oxide, heating said mixture to a temperature at which the oxide is reduced and fused metallic cobalt formed, treating the fused metal with calcium carbonate and calcium fluoride in the proportions of about 3.5 to 5 parts of calcium carbonate and 1.7 to 3.5 parts of calcium fluoride for every 100 parts of cobalt oxide, adding to the fused metal cobalt oxide to regulate the carbon content thereof, separating the thus treated metal from the slag, dissolving the separated metal in nitric acid to form a solution of cobalt nitrate, recovering cobalt nitrate from said solution, and heating said cobalt nitrate to a temperature at which the nitrate is decomposed and cobalt oxide formed.

13. The process of oxidizing ammonia which comprises contacting a gas containing ammonia and oxygen with a catalyst prepared by treating cobalt metal containing impurities heated to fusion with a flux to form a slag, separating the thus treated metal from the slag and treating said metal to convert it into a cobalt oxide catalyst active for the oxidation of ammonia.

14. The process of oxidizing ammonia which comprises contacting a gas containing ammonia and oxygen with a catalyst prepared by treating cobalt metal heated to fusion with a flux to form a slag, said metal containing an impurity from the group consisting of phosphorus, calcium and arsenic materials, separating the thus treated metal from the slag and converting the separated metal into cobalt oxide.

15. The process of oxidizing ammonia which comprises contacting a gas containing ammonia and oxygen with a catalyst prepared in accordance with the process of claim 10.

16. The process of oxidizing ammonia which comprises contacting a gas containing ammonia and oxygen with a catalyst prepared by treating cobalt metal containing impurities heated to fusion with a basic flux to form a slag, separating the thus treated metal from the slag and treating said metal to convert it into a cobalt oxide catalyst active for the oxidation of ammonia.

EUGENE DWIGHT CRITTENDEN.